June 2, 1942.  G. L. LARISON  2,284,665
VEHICLE SUSPENSION
Filed July 5, 1940     5 Sheets—Sheet 1

Inventor
Glenn L. Larison
By T. J. Geisler
and F. R. Geisler
Attorneys

June 2, 1942.　　　G. L. LARISON　　　2,284,665
VEHICLE SUSPENSION
Filed July 5, 1940　　　5 Sheets-Sheet 3

Inventor
Glenn L. Larison
By T. J. Geisler
and F. R. Geisler
Attorneys

June 2, 1942.   G. L. LARISON   2,284,665
VEHICLE SUSPENSION
Filed July 5, 1940   5 Sheets-Sheet 4

Inventor
Glenn L. Larison
By T. J. Geisler and T. L. Geisler
Attorneys

June 2, 1942.  G. L. LARISON  2,284,665
VEHICLE SUSPENSION
Filed July 5, 1940  5 Sheets-Sheet 5

Inventor
Glenn L. Larison
By T. J. Geisler
and H. Geisler
Attorneys

Patented June 2, 1942

2,284,665

UNITED STATES PATENT OFFICE 2,284,665

VEHICLE SUSPENSION

Glenn L. Larison, La Grande, Oreg., assignor to Larison Compensating Axle Corporation, a corporation of Oregon Application July 5, 1940, Serial No. 344,016

9 Claims. (Cl. 280—124)

This invention relates to compensating wheel mounting for vehicles in which the vehicle wheels are arranged in pairs, with each wheel of the pair mounted separately so that it may roll independently of the other and rise above or drop below the other, but with the two wheels of the pair so connected that each will carry its share of the load at all times regardless of the irregularities in the surface of the roadway.

This invention also relates in general to vehicle suspension employing walking beams or longitudinally-extending, pivotally-mounted members with the wheel mountings at or near the ends of such walking beams or members. The ordinary walking beam construction is designed to divide the load supported on such walking beam between the front and rear pairs of wheels, permitting one pair of wheels to be raised above the other, and thus tilting the walking beam in its vertical plane, while producing only a reduced lifting or lowering of the vehicle frame. The improved results obtainable by using compensating pairs of wheel mountings in combination with a walking beam have already been illustrated in my United States Letters Patent No. 2,119,407, issued under date of May 7, 1940, and entitled "Compensating wheel mounting for vehicles," and in my United States Letters Patent No. 2,170,454, dated August 22, 1939, and entitled "Shock reducing and cushioning wheel mounting for vehicles," reissued under date of June 18, 1940, Reissue No. 21,483. One objection to various types of running gear assemblies employing walking beams, however, is the fact that, under certain conditions, the keeping of the two pairs of wheels at the front and rear of the walking beam in alignment with the line of travel of the vehicle subjects the walking beam to side thrusts which must be borne entirely by the walking beam and the pivotal mounting of the walking beam, with the result that some side sway of the wheels may be permitted to develop. This is particularly true if the walking beam is longer than usual or if the walking beam comprises a longitudinally-extending leaf spring, as illustrated in my United States Patent No. 2,206,359, issued July 2, 1940, entitled "Spring mounting for vehicles," in which case a twisting of the spring walking beam might take place under extreme conditions.

Another object of this invention, accordingly, is to provide a wheel suspension which may be employed in connection with a walking beam but which will protect the walking beam from side thrusts without reducing its efficiency as an equalizer, and, where the walking beam consists of a spring member, without interfering with the freedom of action of such spring walking beam as a shock absorber as well as equalizer.

Another object of this invention is to provide a running gear assembly in which compensating wheel mounting may be used in combination with a resilient longitudinally-extending equalizer or walking beam without embodying any additional strain or twist on such equalizer.

An additional object is to provide an eight-wheeled vehicle suspension of a type above indicated in which the strain will be distributed over a larger section of the vehicle chassis or frame.

In an ordinary running gear assembly involving a walking beam in which the wheel spindles are mounted directly on the walking beam, or running gear assembly in which the spindle-supporting arms are pivoted to the walking beam, as in the improved construction described in my United States Patent No. 2,119,407 above-mentioned, a walking beam of substantial size is necessary. In some cases, the size and weight of this ordinary walking beam will constitute a further objection to the types of wheel mounting employing such walking beam.

A further and very important object of this invention, however, is to provide a running gear assembly in which a walking beam which is greatly reduced in size and weight may be employed without in any way reducing the efficiency obtainable with ordinary-size walking beams, and at the same time affording a saving in space, weight and expense and permtting, because of the reduced size of the walking beam, various improvements in design and construction of the vehicle frame and making possible a lower suspension for the frame.

The manner in which these and incidental objects may be attained through my invention will be apparent from the following description of embodiments illustrating ways in which my invention may be employed, in which description reference is to be had to the accompanying drawings.

Figure 1:
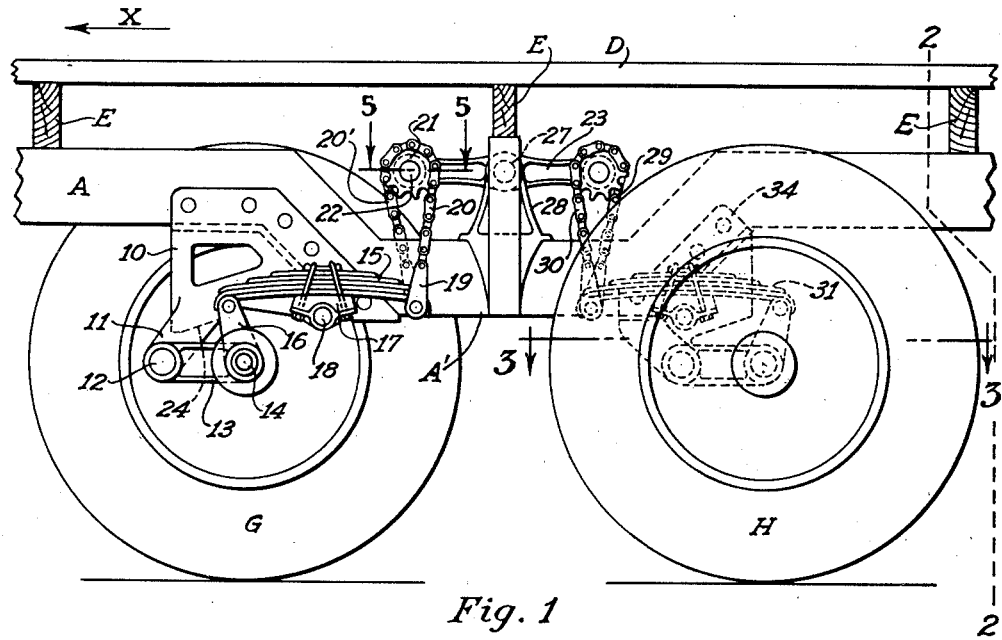
Figure 1 is a side elevation of a portion of a vehicle chassis supported on two sets of four wheels by resilient compensating mechanism, the near-side front wheel having been removed from the assembly in the drawing for the sake of clarity.

Referring first to the general construction of the running gear assemblies illustrated in Figures 1, 2, 3, 4 and 7, it will be observed that the portion of the vehicle chassis shown is carried on eight wheels, or four pairs of wheels, arranged in two groups of four wheels, or two pairs of wheels, each. The two pairs of wheels in each group are in tandem formation. Each group supports one side of the vehicle frame and the wheels in each group are interconnected by linkage which functions to equalize the load on all four wheels of the group and to minimize the effect of vertical movement of the wheels on that side of the vehicle chassis, as apparent later on from the description.

In the drawings it is to be assumed that the running gear assemblies illustrated are attached to the rear portion of a heavy vehicle adapted to travel mainly in the direction of the arrow $x$, so that all the wheel spindle supporting arms trail behind their hinged connections with the chassis in the forward movement of the vehicle.

Figure 2:
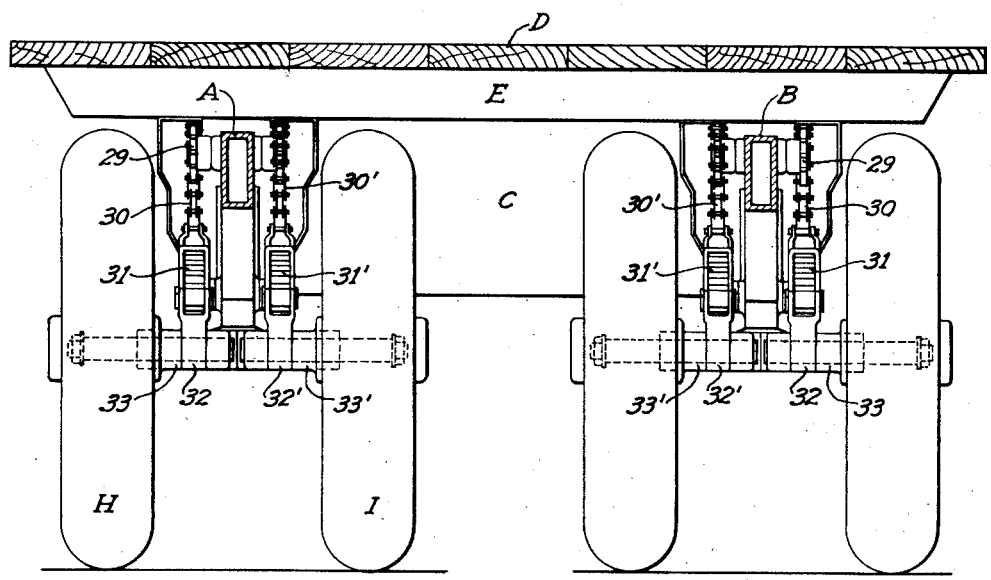
Figure 2 is a corresponding end elevation of the assembly as viewed from the plane of the dotted line 2—2 in Figure 1.
Figure 3:
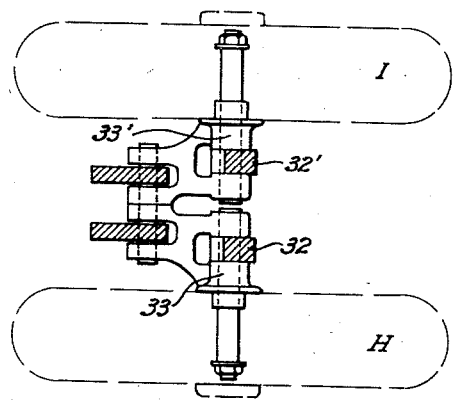
Figure 3 is a fragmentary horizontal section taken on line 3—3 of Figure 1 and showing the hinged arms which connect the wheel spindles to the vehicle chassis.

The chassis illustrated in Figures 1 and 2 comprises a pair of parallel rigid longitudinal members A and B which may be of box or double channel cross-section and which are preferably formed with "drop sections" as shown at A' in Figure 1. A cross beam C (Figure 2) is securely attached to the two rigid chassis members A and B at the centers of the "drop sections," and between the forward and rear rows of wheels, and this cross beam, holds the side members A and B in fixed relationship so as to constitute a rigid frame. Any type of body may be superimposed on the chassis, for example, the platform D laid on transverse stringers E bridging the members A and D and securely attached thereto in any suitable manner. The particular form and construction of the vehicle chassis, however, is not important, since my invention may readily be adapted to various types of vehicle chassis.

To each of the side frame members A and B a forward bracket 10 is rigidly attached. Each bracket 10 is formed with a pair of arms 11 extending downwardly and outwardly from the bracket 10. Each arm 11 carries a hinge pin 12 on which a pair of bifurcated spindle-carrying arms 13 and 13' (see Figures 1 and 4) are pivotally mounted for up and down movement. These arms 13 and 13' extend rearwardly in the normal line of travel of the vehicle, from their hinge pins, and at their outer or rear ends, these arms carry the spindles 14 on which the wheels such as F and G are mounted. The spindles for each pair of wheels F and G are normally in axial alignment transversely, but, since each spindle is carried by a separate arm, the spindles, and consequently the wheels F and G, may be moved up or down with respect to each other in parallel planes spaced always the same distance apart.

Figure 4:
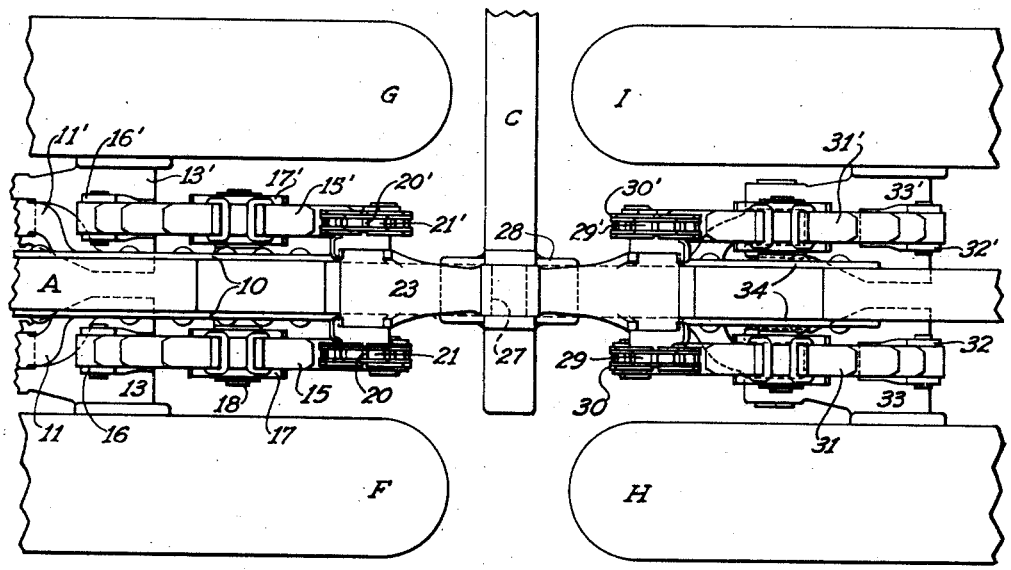
Figure 4 is a fragmentary plan view of the assembly shown in Figure 1 but with the superimposed platform body removed.

The wheel-carrying arms 13 and 13' are connected by shackles 16 and 16' to the ends of the leaf springs 15 and 15' respectively (see Figures 1 and 4). The leaf springs 15 and 15' are mounted in cradles 17 and 17' which are independently, rockably disposed on a transverse pin 18 extending through the bracket 10. The other ends of the springs 15 and 15' are connected to shackles 19 and 19' respectively (see Figure 7), which in turn are coupled to the ends of sprocket chains 20 and 20', passing over the sprocket wheels 21 and 21' respectively (see also Figure 4). The sprocket wheels 21 and 21' are keyed to the opposite ends of a transverse shaft 22 journaled in the end of a rocker 23. The near-side chain 20 is passed in one direction, (counterclockwise) over its sprocket 21, while the other chain 20' is passed in the opposite direction, (clockwise) over its sprocket 21', the ends of the chains being secured on the sprockets, so that movement of the two sprockets 21 and 21', and connecting shaft 22 in one direction will cause one chain to be taken up on its sprocket and the other chain to be paid out by the other sprocket.

Figure 7:
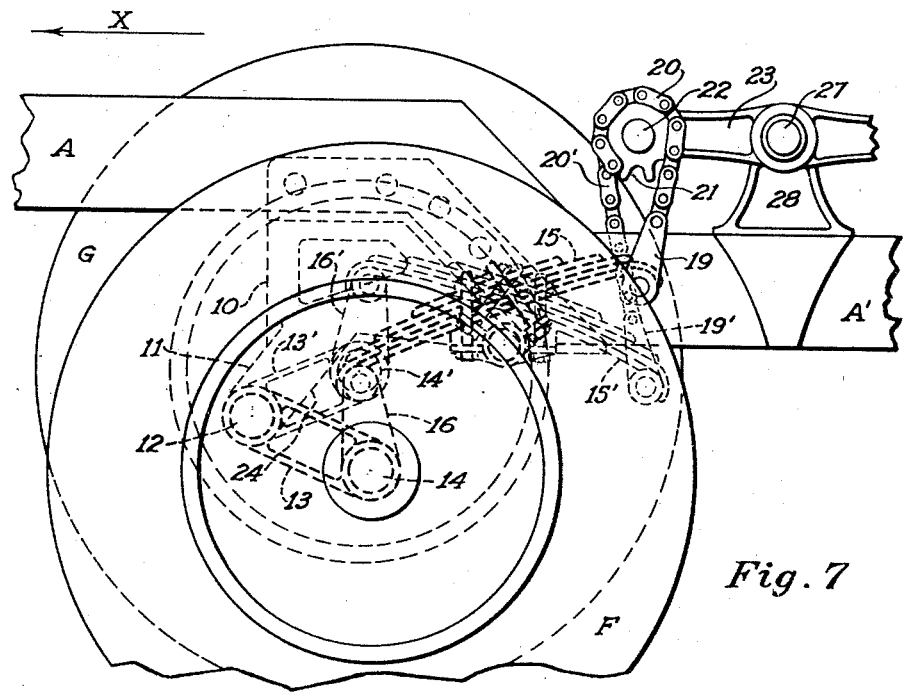
Figure 7 is a side elevation corresponding to the forward portion of the assembly shown in Figure 1 but drawn to a larger scale and with the parts of the compensating running gear shown in certain operative position.

Thus, referring to Figure 7, assuming that the rocker 23 remains in the same position, the upward movement of one wheel, for instance the wheel G, will cause a force to be exerted on the other wheel F in the opposite direction; and, if there is no deflection of the springs 15 and 15' and no movement of the rocker 23, one-half of the undulating movements of the wheels, when one of the wheels is raised in passing over a bump or is lowered in passing over a depression in the road surface, will be transmitted to the bracket 10 and the vehicle chassis. Actually, however, the springs are usually deflected somewhat by the shock produced by such road inequalities together with the load of the vehicle, so that a considerably less amount of movement is really transmitted to the chassis.

Referring again to Figures 1, 2 and 4, a rear bracket 34, similar to the forward bracket 10, is also secured to each of the side frame members A and B. To each rear bracket 34 a pair of spindle-carrying arms 33 and 33' are hinged. Each spindle-carrying arm 33 or 33' is connected by a suitable shackle 32 or 32' to a leaf spring 31 or 31' respectively. These leaf springs are supported in cradles which are pivotally mounted on the bracket 34, and the entire construction and the manner in which these assemblies function is the same as that already described for the forward wheel assemblies.

The forward end of each spring 31 or 31' is connected to a sprocket chain 30 or 30' passing over a sprocket 29 or 29' respectively. The sprockets 29 and 29' are connected for movement in unison, the same as the forward sprockets 21 and 21', and are mounted for rotation at the rear end of the rocker 23. The chains 30 and 30' in each pair similarly pass over their respective sprockets in opposite directions so that movement of one spindle-carrying arm 33 and its connected spring 31 will cause a force to be exerted in the opposite direction on the other spring 31' and its connected spindle-carrying arm 33' in the manner already described.

The rocker 23, which is, in effect, a short beam fulcrumed at its middle on a pin 27 mounted in a bifurcated pedestal 28 secured to the side frame member midway between the tandem pairs of wheels, functions to reduce the effect on the chassis of the vertical movements of the tandem pairs of wheels. In this respect the rocker 23 acts in the same way as an ordinary "walking beam" and yet, in the constructions illustrated, the rocker 23 can be made much smaller and lighter than would be possible with an ordinary "walking beam," as apparent from Figure 1. In the construction described, there is, of course, one rocker to each set of four wheels, each rocker carrying a pair of sprockets at each end, which sprockets effect the compensating action between the wheels of each pair.

In operation therefore the sprockets, springs and associated mechanism for each pair of wheels will reduce the effect of the up and down movement of the wheels of the pair to less than one-half, while the rocker 23 will reduce this amount further by one-half, with the result that the actual vertical movement finally transmitted to the corresponding side of the vehicle chassis will be less than one-fourth.

Figure 6:
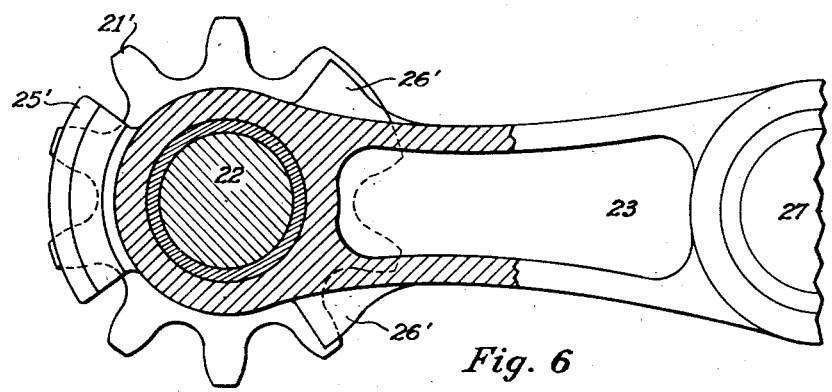
Figure 6 is a vertical section of the same member taken on line 6—6 of Figure 5.
Figure 5:
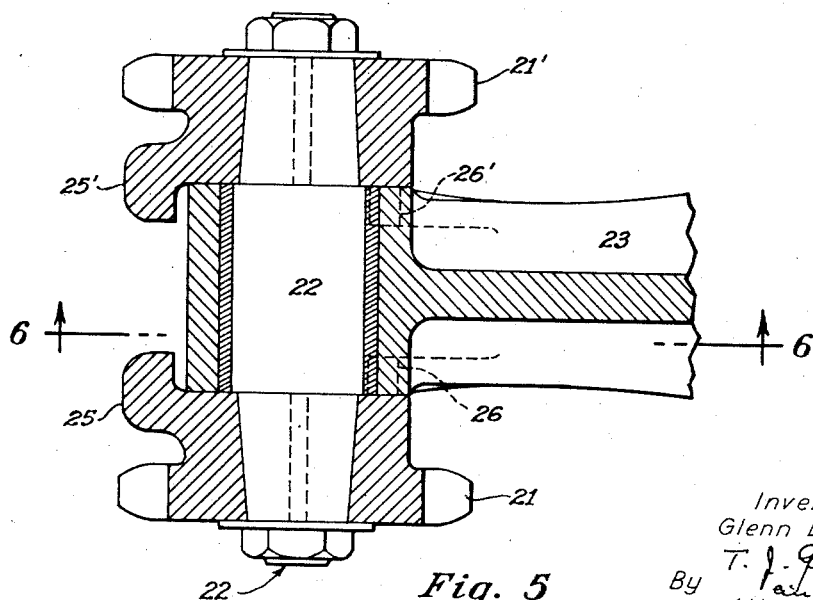
Figure 5 is an enlarged horizontal section taken on line 5—5 of Figure 1 and showing certain important structural details of one of the compensating parts.

In order to limit the upward or downward movement of either wheel of a pair, and thus to insure the carrying of the double load by one wheel, in the event that the tire of the other should become too deflated, or in the event that the spring for the other wheel should become broken, I provide means to limit the extent of the rotational movement of the sprockets, such means being shown in Figures 5 and 6. Segmental lugs 25 and 25' are formed integral with the hubs of the sprockets 21 and 21' respectively and are so arranged as to allow a predetermined amount of rotation of the sprockets in either direction from the normal midway position before these lugs abut the stop shoulders 26 or 26' formed on the rocker 23. Similar lugs and stop shoulders are provided for the sprockets at the other end of the rocker 23, and for the same purpose. Thus with the failure of one wheel of either pair, the other wheel will carry the double load, and under such circumstances the rocker 23 will still function as a "walking beam" or equalizer between the forward and rear pairs of wheels. Should the breaking of both springs of a pair occur, or should the rocker 23 itself become broken, stop shoulders, such as that indicated at 24 in Figure 1, are provided on the brackets 10 and 34 and serve as definite final limits to the upward movements of the spindle-carrying arms, and consequently of the wheels, in such extreme cases.

Figure 10:
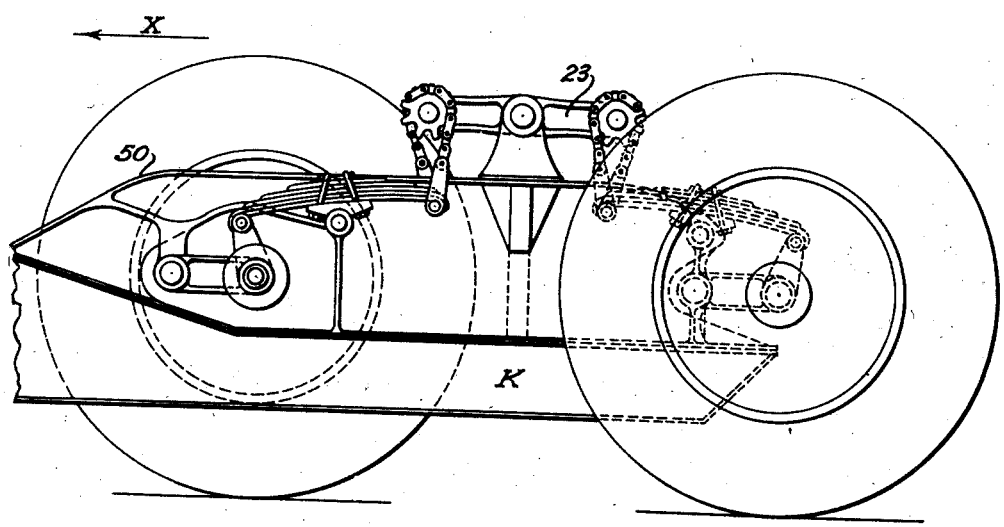
Figure 10 is a side elevation showing my improved running gear assembly mounted on a different type of vehicle frame.

The running gear construction which I have described may be applied to many different types of vehicle chassis in addition to that which I have illustrated in Figure 1. For example, in Figure 10 I show how this form of my running gear may be mounted on an "under-slung" chassis designed to have a very low center of gravity. The side members K of this vehicle chassis are provided with superimposed beams 50 securely attached thereto and adapted to support the various parts of the compensating mechanism for the pairs of wheels together with the equalizer or rocker 23 connecting the compensating mechanism for the two pairs. In this type of vehicle all loads of course would be carried forwardly of the wheel assemblies shown.

Figure 8:
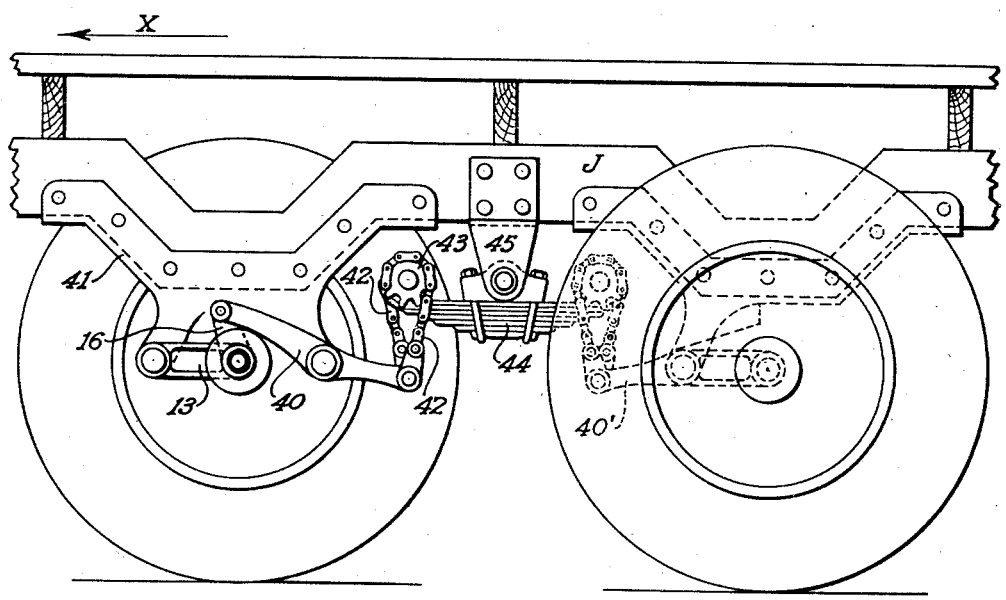
Figures 8 and 9 are side elevations of modified forms of my invention, the forward nearside wheel in each case having been removed from the assembly in the drawing for the sake of clarity.

While I have shown a rigid bar 23 used as the rocker, equalizer or "walking beam," in the vehicle mountings thus far described, a spring rocker or "walking beam" might also be used effectively in a running gear assembly of this general type. Such an arrangement with a spring rocker is illustrated in Figure 8. In this figure, however, I have shown rigid lever arms, in place of the spring levers to which the forward spindle-carrying arms are attached as in the construction of Figure 1. Referring to Figure 8, each forward spindle-carrying arm 13 is connected by a shackle 16 to one end of a lever 40 fulcrumed on the fixed forward bracket 41. The opposite ends of these levers are connected to the sprocket chains 42 which are passed in opposite directions around their sprockets 43. The sprockets in this case are mounted for rotation in the eye of a compound leaf spring rocker 44. The leaf spring 44 is rockably disposed in a hanger 45 which in turn is rigidly secured to the side member J of the chassis as shown. The spindles for the rear wheels in this construction may be mounted directly on the rear lever arms 40', and the sprocket chains attached to the opposite or forward ends of these rear lever arms 40'.

The result obtained with this form of construction is similar to that obtained with the construction shown in Figure 1, except that the up and down movement of the two wheels of each pair with respect to each other is equal and in unison and thus, in the construction shown in Figure 8, movement equal to exactly one-half reduction of motion of the wheels will be transmitted to the end of the rocker. However the resiliency of the spring rocker 44 will result in the absorption of part of this movement, under ordinary circumstances, so that, as a result, the up or down movement finally transmitted to the vehicle frame will be considerably reduced.

Figure 9:
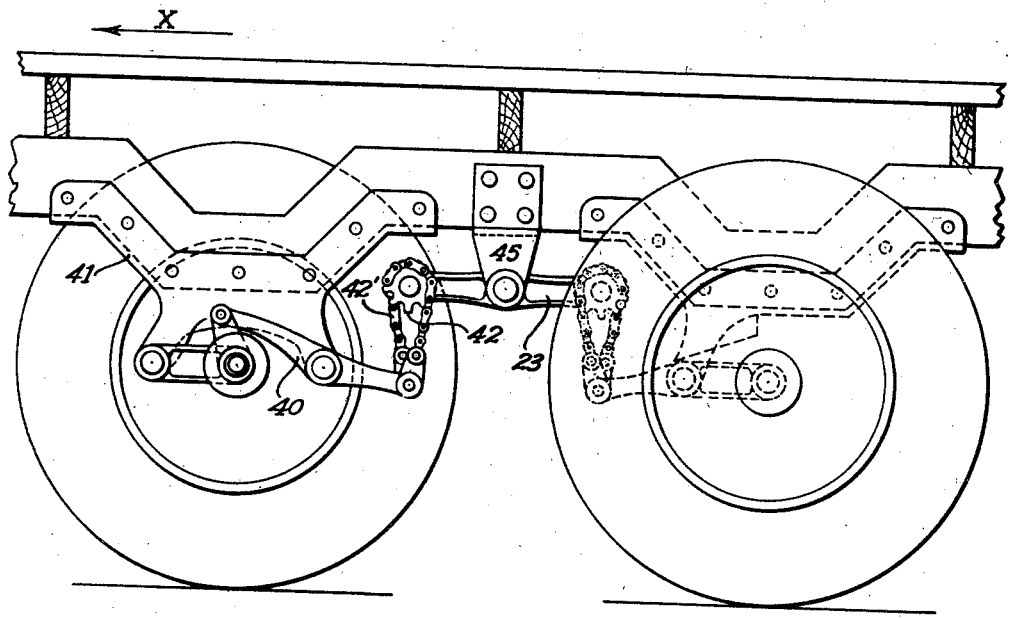

It would be possible of course to combine the spring levers 15, 15', and 31, 31' of the construction of Figure 1 with a spring rocker similar to the rocker 44 of Figure 8 to obtain even further spring action in this running gear assembly. And, on the other hand, it would be possible to dispense with the spring members entirely and combine the rigid lever arms 40 and 40' of Figure 8 with the rigid rocker or equalizer 23 of Figure 1. This latter combination is illustrated in Figure 9. The construction shown in Figure 9 consequently dispenses entirely with resiliency in the vehicle suspension members, and permits exactly the transmission of one-quarter of the movement of the wheels of the two pairs to the vehicle frame. Other modifications would of course be possible by changing the fulcrum points of the lever arms in any of these combinations.

Various further modifications in the positioning, mounting, and construction of the lever arms which, together with the chains and sprockets constitute the compensating mechanism of my invention, might be made without departing from the principle of my invention. The same is also true of the rocker or equalizer which is employed when my invention is to be embodied in an eight-wheel assembly. It is not my intention therefore to restrict my invention to the specific forms of construction which I have shown on the particular arrangement of parts illustrated; or to limit the invention otherwise than as set forth in the attached claims.

I claim:

1. In a running gear assembly, a pair of wheel-carrying arms hinged to the vehicle frame for up and down movement, a wheel spindle in each arm, said spindles extending in opposite directions and substantially parallel to the hinges of said arms, a second pair of hinged wheel-carrying arms hinged to the vehicle frame and spaced from, but in substantial longitudinal alignment with said first-mentioned pair of arms respectively, a pivotally-mounted, longitudinally-extending rocker located between said first and said second-mentioned pairs of arms, a pair of sprocket wheels mounted at each end of said rocker, the sprocket wheels of each pair connected for movement in unison, means connecting each wheel-carrying arm with a respective sprocket wheel, said means including a sprocket chain attached to each sprocket wheel, said means so arranged and constructed that movement of one wheel-carrying arm of either pair will act through the corresponding pair of sprocket wheels to cause a force to be exerted in the opposite direction on the other wheel-carrying arm of that pair.

2. The combination described in claim 1 with the addition of means carried by said sprocket wheels limiting the rotation of said sprocket wheels and thereby restricting the up and down movement of each wheel-carrying arm with respect to the other wheel-carrying arm of the pair.

3. In a running gear assembly a longitudinally-extending, pivotally-mounted equalizer, a pair of sprockets mounted for rotation at each end of said equalizer, the sprockets of each pair connected for movement in unison, a pair of longitudinally-extending, pivotally-mounted lever arms supported on the vehicle frame and located forwardly of said equalizer and a second pair of longitudinally-extending, pivotally-mounted lever arms supported on the vehicle frame and located rearwardly of said equalizer and in substantial alignment respectively with said forward lever arms, sprocket chains connecting the ends of said lever arms with said sprockets respectively, the sprocket chains in each pair passing around said sprockets in opposite directions to provide compensating movement between the lever arms of each pair, and wheel spindles connected to the opposite ends of said lever arms.

4. The combination described in claim 3 with said equalizer comprising a resilient spring member.

5. The combination described in claim 3 with said lever arms comprising resilient spring members.

6. In a vehicle suspension, a pair of brackets in longitudinal alignment attached to the vehicle frame, a longitudinally-extending, pivotally-mounted equalizer supported on said frame between said brackets, a pair of wheel-carrying arms hinged to each bracket for up and down movement, a pair of longitudinally-extending lever-like members pivotally-mounted on each bracket, a pair of sprockets mounted at each end of said equalizer, the sprockets of each pair connected for movement in unison, sprocket chains connecting the ends of said lever-like members to said sprockets respectively, the chains for each pair of sprockets passing over said sprockets in opposite directions, the other ends of said lever-like members connected to said wheel-carrying arms respectively.

7. In a running-gear assembly a longitudinally-extending rocker mounted for up and down pivotal movement, two pairs of hinged wheel-carrying arms connected to the vehicle near the opposite ends of said rocker, each of said arms hinged for independent up and down movement, a wheel spindle on each arm, ground-engaging wheels on said spindles, the hinges of said arms being substantially parallel to said wheel spindles, compensating mechanisms interconnecting the arms of each pair and including means supported on the ends of said rocker respectively, said compensating mechanisms acting to divide the load supported by each pair of wheels equally between the two wheels of the pair and said rocker acting to control the division of the load supported by said assembly between said pairs of wheels, whereby each of said four wheels will carry its predetermined share of the vehicle load and said hinged wheel-carrying arms will relieve said rocker of all lateral stresses exerted on the vehicle wheels.

8. In a vehicle suspension, a pair of wheel-assembly supporting members in longitudinal alignment attached to the vehicle frame, a longitudinally-extending, pivotally-mounted rocker supported on said frame between said wheel-assembly supporting members, a pair of wheel-carrying arms hinged to each wheel-assembly supporting member for up and down movement in parallel planes, a pair of longitudinally-extending lever-like spring members pivotally-mounted on each wheel-assembly supporting member, a pair of sprockets mounted at each end of said rocker, the sprockets of each pair connected for movement in unison, sprocket chains connecting the ends of said lever-like spring members to said sprockets respectively, the chains for each pair of sprockets passing over said sprockets in opposite directions, means for limiting the rotation of said sprockets, the other ends of said lever-like spring members connected to said wheel-carrying arms respectively.

9. In a vehicle suspension, a longitudinally-extending rocker mounted for up and down pivotal movement and located at one side of the vehicle, a pair of wheel-carrying assemblies hinged to the vehicle at the same side as said rocker and located near one end of said rocker, and another pair of wheel-carrying assemblies connected to the vehicle at the same side but near the opposite end of said rocker, each of said assemblies hinged for up and down movement, a wheel spindle carried by each assembly, the spindles in each pair of assemblies extending in opposite directions and normally in transverse alinement with each other, the hinges of said assemblies being substantially parallel to said spindles, compensating mechanism inter-connecting the assemblies in each pair, each of said compensating mechanisms including means supported on the corresponding ends of said rocker respectively, said compensating mechanisms acting to divide the load supported by each pair of wheel-carrying assemblies equally between the two assemblies of the pair and said rocker acting to control the division of the load at that side of the vehicle equally between the two pairs of wheel-carrying assemblies, whereby each of said four wheel-carrying assemblies will support its share of the vehicle load and said hinged wheel-carrying assemblies will relieve said rocker of all lateral stresses exerted on the vehicle wheels.

GLENN L. LARISON.